United States Patent [19]

Takahashi et al.

[11] Patent Number: 4,752,823
[45] Date of Patent: Jun. 21, 1988

[54] IMAGE RECORDING APPARATUS FOR GENERATING A STILL IMAGE FROM A VIDEO SIGNAL

[75] Inventors: Junji Takahashi, Kanagawa; Kazuaki Wakatsuki, Tokyo; Hiroaki Tateiri, Kanagawa, all of Japan

[73] Assignee: Nippon Avionics Co., Ltd., Nishi-shinbashi, Japan

[21] Appl. No.: 743,064

[22] Filed: Jun. 10, 1985

[30] Foreign Application Priority Data

Jun. 12, 1984 [JP] Japan ................... 59-119056

[51] Int. Cl.[4] .................. G03F 3/08; H04N 1/21; H04N 1/46; H04N 5/84
[52] U.S. Cl. ..................... 358/80; 358/78; 358/244; 358/302
[58] Field of Search .............. 358/75, 77, 78, 164, 358/244, 267, 302, 332, 140, 76, 80, 244.1, 244.2, 345, 346, 347, 348, 302

[56] References Cited

U.S. PATENT DOCUMENTS

| 2,995,619 | 8/1961 | Freeman | 358/332 |
| 3,878,559 | 4/1975 | Pugsley | 358/77 |
| 4,112,459 | 9/1978 | Gautier et al. | 358/332 |
| 4,130,834 | 12/1978 | Mender et al. | 358/302 |
| 4,339,769 | 7/1982 | Fujita et al. | 358/244 |
| 4,412,230 | 10/1983 | Goldberg | 358/348 |
| 4,438,453 | 3/1984 | Alston | 358/75 |
| 4,451,848 | 5/1984 | Okada et al. | 358/140 |
| 4,467,369 | 8/1984 | Alston | 358/75 |
| 4,468,693 | 8/1984 | Fujita et al. | 358/75 |
| 4,473,849 | 9/1984 | Cool | 358/244 |
| 4,627,004 | 12/1986 | Cool et al. | 358/244 |

FOREIGN PATENT DOCUMENTS

| 59-67787 | 4/1984 | Japan | 358/78 |
| 2074413 | 10/1981 | United Kingdom | 358/332 |

OTHER PUBLICATIONS

Anonymous, "Method for Producing Photographic Color Prints from Video Tape Records", *Research Disclosure*, No. 131 (Mar. 1975), p. 42, Item #13155.

Primary Examiner—Edward L. Coles, Sr.
Assistant Examiner—Randall S. Svihla
Attorney, Agent, or Firm—Blakely, Sokoloff, Taylor & Zafman

[57] ABSTRACT

In an image recording apparatus, an input video signal is digitized at a plurality of voltage levels, digitized video signals are rate-converted, and digitized still images corresponding to the respective voltage levels are sequentially displayed on a television monitor and are printed together on a film.

12 Claims, 1 Drawing Sheet

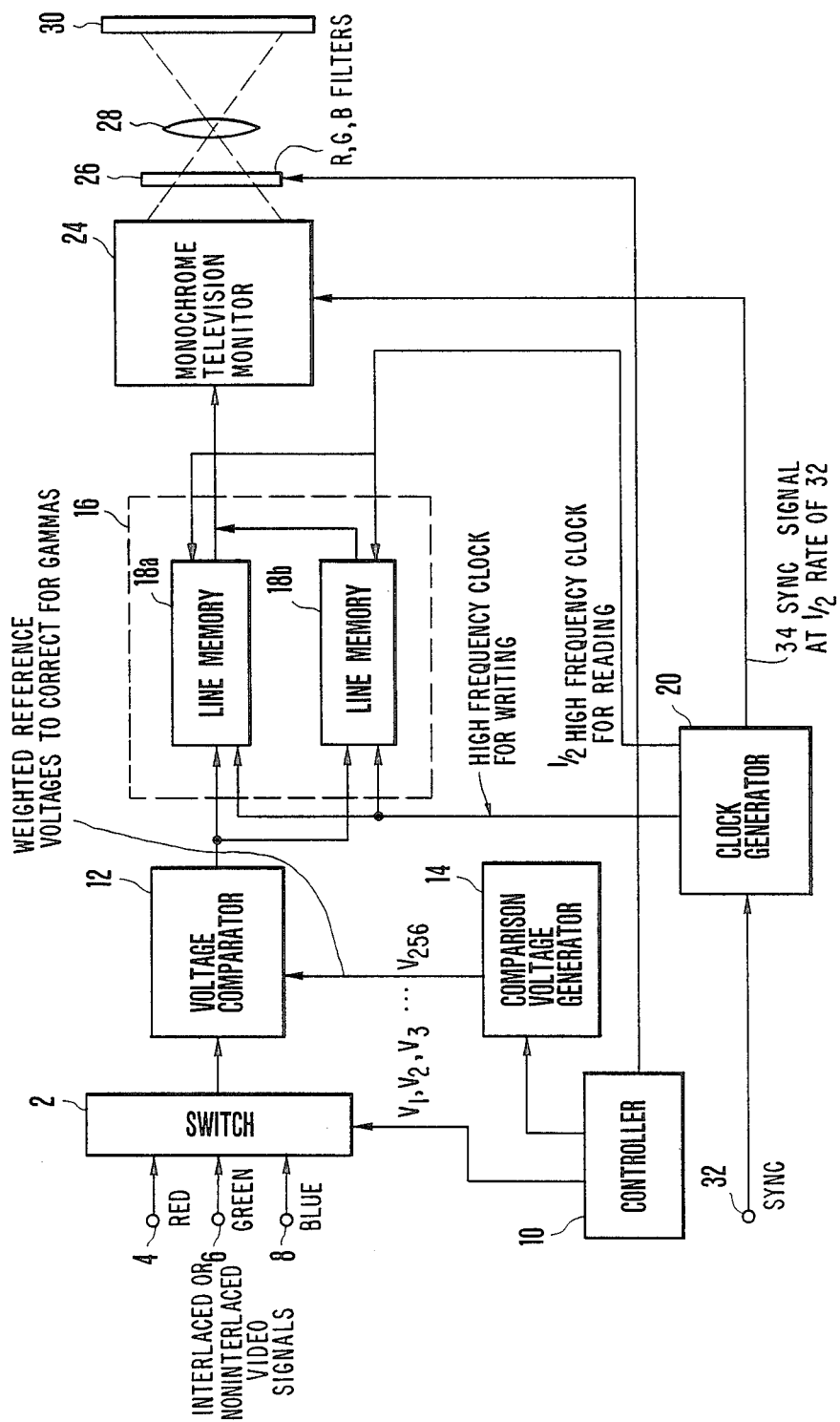

IMAGE RECORDING APPARATUS FOR GENERATING A STILL IMAGE FROM A VIDEO SIGNAL

BACKGROUND OF THE INVENTION

The present invention relates to an image recording apparatus for generating a still image based upon a video signal supplied from a signal source such as a graphic display device, and for recording the still image on a photosensitive material such as film.

Various conventional apparatuses have been proposed wherein a still image is displayed on a television monitor and the displayed still image is recorded on a film through a lens system.

With such a conventional image recording apparatus, gamma characteristics of the film must be corrected to accurately reproduce the still image on the basis of an input video signal. In this case, since the conventional image recording apparatus comprises an analog gamma correction circuit, it is difficult to correct the characteristics accurately over a wide range varying from a low level to a high level.

In addition, when a high-speed input video signal is supplied to the conventional image recording apparatus, a television monitor must be incorporated therein to monitor the input video signal in accordance with the speed of the input signal. However, when the horizontal oscillation frequency of the television monitor is increased, efficiency of the deflection coil is degraded, and an amplifier for amplifying the high-speed video signal becomes complex and highly technical. As a result, a high-speed television monitor results in a large size and high cost, making a compact, low cost high-speed video signal image recording apparatus not commercially feasible.

SUMMARY OF THE INVENTION

It is, therefore, an object of the present invention to provide a compact, low-cost image recording apparatus wherein a still image can be accurately reproduced from a signal source, and a high-speed video signal can be received.

In order to achieve the above object of the present invention, there is provided an image recording apparatus, wherein an input video signal is digitized at a plurality of levels, digitized video signals are rate-converted to a lower scanning frequency, and digitized images corresponding to the respective levels are sequentially displayed on a a television monitor and are printed as being superimposed on a photosensitive material.

BRIEF DESCRIPTION OF THE DRAWING

The accompanying drawing is a block diagram of an image recording apparatus according to an embodiment of the present invention.

DESCRIPTION OF THE PREFERRED EMBODIMENT

Referring to the accompanying drawing, a color video signal from a signal source such as a color graphic display device is supplied as red, green and blue components to terminals 4, 6 and 8. The input video signal is switched in units of color components in response to a control signal from a controller 10.

A voltage comparator 12 slices the video component from a switch 2 with a voltage signal from a comparison voltage generator 14, thereby obtaining a digitized signal.

The comparison voltage generator 14 generates a necessary voltage in response to the control signals from the controller 10. In this embodiment, the comparison voltage generator 14 generates 256 voltages whose level differences are not uniform but are weighted to correct the gamma characteristics (to be described later) of a film.

A memory means 16 comprises line memories 18a and 18b each having a depth of 1 bit. The line memories 18a and 18b sequentially store as pixel data the video signals digitized by the voltage comparator 12 at the scanning rate of the signal source. The pixel data are obtained in response to a sample clock signal generated from a clock generator 20. Each line memory 18a or 18b stores one-scanning line data. The clock generator 20 receives sync signals of the input video signal from a terminal 32. The phase of the sample clock signal is controlled in response to the sync signals.

A television monitor 24 scans the digitized video signal from the memory means 16 in response to a sync signal 34 of the television monitor (i.e., a sync signal having a period twice that of the sync signals received at the terminal 32) and at a video display clock signal, the rate of which is converted to half that of the clock signal which is supplied from the clock generator 20, thereby displaying a digitized image thereon. The conversion of the clock signal to the half rate can be easily attained, for instance, by means of a flip-flop circuit. In this way, the original non-interlaced image of the high line rate signal source can be displayed on the television monitor 24 at half the original rate (rate converted) to compose the same line structure as the original signal source but in the manner of interlaced field images. It should be noted that the monitor television 24 comprises a low-cost commercially available monochrome television which preferably has a flat screen.

A film 30 is disposed in front of the screen of the television monitor 24 and exposed through a color filter 26 and a lens 28. The digitized still image displayed on the television monitor 24 is printed as a monochrome digitized still image on the film 30 in accordance with the color of the color filter 26. The color filter 26 comprises red, blue and green filter components which are switched in response to the control signal from the controller 10.

The operation of the image recording apparatus will now be described.

A high-speed color video signal for producing, for example, a noninterlaced image of 1024 scanning lines is supplied to the terminals 4, 6 and 8 in units of color components. The controller 10 generates a control signal to cause the switch 2 to select the red component, i.e., the video component received at the terminal 4. At the same time, the controller 10 generates a control signal to select the red filter component of the color filter 26.

In this case, the red video component is supplied to the voltage comparator 12. A voltage generated from the comparison voltage generator 14 is the lowest one V1 of the predetermined 256 voltages. The voltage comparator 12 digitizes the red components of one frame by using the voltage V1.

The red components corresponding to odd-numbered scanning lines are separated into pixels in response to the sample clock signal from the clock generator 20. The odd-numbered red components are alternately stored in the line memories 18a and 18b in accordance with the scanning line rates of the signal source. Then, the line memories 18a and 18b are accessed at a ½ rate of the alternate write operation.

The readout signal from the memory means 16 is scanned by the television monitor 24, so that an odd field of the digitized monochrome image is displayed on the screen.

In this case, the red filter component of the color filter is selected and the odd field of the digitized image is printed on the film 30.

The video signal of the identical frame which is subsequently supplied to the switch 2 is digitized by the voltage comparator 12 with the voltage V1. However, in this case, the red video components corresponding to even-numbered scanning lines are stored in the memory means 16. The stored components are read out at ½ rate of the write operation in the same manner as the odd line readout operation, so as to display an even field of the digitized monochrome picture on the screen of the television monitor 24. In this case, for the even field display, the vertical sync signal timings are slightly changed so as to place even scanning lines between the odd lines, thus constructing the same pattern as the signal source. This even-field image is printed on the film through the color filter 26, thereby obtaining a one-frame picture of the red components.

The video signal of the identical frame which is subsequently supplied to the switch 2, then, is digitized by the voltage comparator 12 with a voltage V2 which is higher by one level than the voltage V1. The image digitized with the voltage V2 is processed in units of fields, and the odd and even fields are printed on the film 30 to constitute a one-frame image. In this case, the digitized video components are also printed through the red filter component of the color filter 26, thereby obtaining the red digitized image.

The red image digitized with the voltage V2 is superimposed on the image digitized with the voltage V1, so that a three-gradation image is formed on the film 30, including the base/fog density of the film.

Similarly, the images digitized with the voltages V3 through V256 are sequentially printed being superimposed further on the preceding images on the film 30, thereby obtaining an image having red graduations.

The controller 100 supplies a control signal to the switch 2 which then selects the video component supplied at the terminal 6. At the same time, the green filter component of the color filter 2 is selected.

Therefore, the green video components are sequentially supplied to the voltage comparator 12 and digitized with the voltages V1 through V256, thereby forming an image having green component gradations on the film 30. The image having the green gradations is superimposed on the image having the red gradations.

Finally, the controller 10 causes the switch 2 to select the blue video components and selects the blue filter component of the color filter 26. In this case, an image having blue component gradations is formed being superimposed on the images having the red and green component gradations.

A tricolor image is thus recorded on the film 30.

The present invention is not limited to the particular embodiment described above. Various changes and modifications may be made within the scope and spirit of the invention.

In the above embodiment, the digitized video signals are scanned at a low rate (½ of the write operation) by dividing one frame image into odd- and even-field images. However, interlaced scanning of every n scanning lines can be performed to obtain one digitized frame from the original n frames. In this case, the scanning rate can be further decreased.

The switch 2 and the color filter 26 can be omitted when the input video signal comprises a monochrome signal. In this case, a monochrome image including a half-tone component can be formed on the film 30.

In the above embodiment, the input video signals comprise noninterlaced video signals. However, an interlaced video signal may be used.

In the above embodiment, the number of gradations is 256, but is not limited to 256.

The memory means comprises two line memories, but need not comprise two line memories.

As is apparent from the above description, according to the image recording apparatus of the present invention, the input video signals are digitized at a plurality of levels, and the digitized video components are rate-converted. The converted video components are sequentially displayed on the television monitor in accordance with the respective levels. The resultant digitized images are printed being superimposed with each other on the film, thereby accurately reproducing the still image from the signal source. The compact, low-cost image recording apparatus of the present invention can receive a high-speed video signal.

What is claimed is:

1. An image recording apparatus comprising:
   (a) means for successively digitizing an input video signal according to a predetermined set of successive discretely changing reference voltages representing successive gray levels of said input video signal;
   (b) memory means for storing results produced by said digitizing means at the rate at which the results are produced; and
   (c) means for reading out the results stored in said memory means and displaying the read-out results on a display means in such a manner that the results of successively digitizing said input video signal are successively displayed on said display means and integrated, through an optical system, on a photosensitive material to record an image which closely matches the appearance of an image produced by displaying the input video signal on a television monitor.

2. An apparatus according to claim 1, wherein said memory means includes line memories.

3. An apparatus according to claim 1, wherein said optical system includes a lens.

4. An apparatus according to claim 1, wherein:
   said input video signal comprises a plurality of color component signals;
   said digitizing means comprises a voltage comparator for digitizing said input video signal and a switch for supplying a selected one of said color component signals to said voltage comparator to be digitized;
   said optical system comprises a plurality of color filters and means for disposing a selected one of said color filters in front of said display means; and wherein said apparatus further comprises:
   means for simultaneously controlling said switch and said color filter disposing means.

5. An apparatus according to claim 1, further comprising clock generator means for receiving a synchronizing signal contained in the input video signal and for generating clock signals which are supplied to said memory means and a synchronizing signal which is supplied to said display means, wherein the synchronizing signal supplied to said display means has a lower frequency than the synchronizing signal contained in the input video signal.

6. An apparatus according to claim 1, wherein the number of said successive discretely changing reference voltages corresponds to the number of said successive gray levels of said input video signal.

7. An apparatus according to claim 1, where said reference voltages are weighted to correct for the gammas of the display means and the photosensitive material.

8. An apparatus according to claim 1, wherein the input video signal comprises a non-interlaced video signal.

9. An apparatus according to claim 1, wherein the input video signal comprises an interlaced video signal.

10. An apparatus according to claim 1, wherein the rate at which the results are read out of said memory means is not more than half of the rate at which the results are stored in said memory means.

11. An apparatus according to claim 1, wherein said display means comprises a scanning light source.

12. An apparatus according to claim 1, wherein the read-out results are displayed on said display means by interlace scanning.

* * * * *